United States Patent
Zheng et al.

(10) Patent No.: US 10,595,522 B2
(45) Date of Patent: Mar. 24, 2020

(54) BLADELESS FAN WITH MOSQUITO KILLING FUNCTION

(71) Applicant: Ningbo Dayang Industry and Trade Co., Ltd., Zhejiang (CN)

(72) Inventors: Jun Zheng, Zhejiang (CN); Yuanai Ning, Jiangxi (CN); Litao Hu, Zhejiang (CN)

(*) Notice: Subject to any disclaimer, the term of this patent is extended or adjusted under 35 U.S.C. 154(b) by 298 days.

(21) Appl. No.: 15/622,071

(22) Filed: Jun. 13, 2017

(65) Prior Publication Data

US 2018/0035658 A1   Feb. 8, 2018

(30) Foreign Application Priority Data

Aug. 5, 2016   (CN) .................. 2016 2 0852886 U

(51) Int. Cl.
| | | |
|---|---|---|
| *A01M 1/06* | (2006.01) | |
| *A01M 1/04* | (2006.01) | |
| *A01M 1/22* | (2006.01) | |
| *A01M 1/08* | (2006.01) | |
| *F04D 29/54* | (2006.01) | |
| *F04F 5/16* | (2006.01) | |
| *F04D 25/08* | (2006.01) | |
| *F04D 29/40* | (2006.01) | |
| *F04D 29/52* | (2006.01) | |

(52) U.S. Cl.
CPC .............. *A01M 1/06* (2013.01); *A01M 1/04* (2013.01); *A01M 1/08* (2013.01); *A01M 1/223* (2013.01); *F04D 29/547* (2013.01); *F04F 5/16* (2013.01); *A01M 1/22* (2013.01); *F04D 25/08* (2013.01); *F04D 29/403* (2013.01); *F04D 29/522* (2013.01)

(58) Field of Classification Search
CPC   A01M 1/04; A01M 1/06; A01M 1/08; A01M 1/22; A01M 1/223; A01M 3/025; F04D 25/08; F04D 29/403; F04D 29/522; F04D 29/547; F04F 5/16
USPC .......................... 43/112, 113, 134, 137, 139
See application file for complete search history.

(56) References Cited

U.S. PATENT DOCUMENTS

| | | | | |
|---|---|---|---|---|
| 6,286,249 | B1 * | 9/2001 | Miller .................... | A01M 1/02 43/113 |
| 6,840,003 | B2 * | 1/2005 | Moore ................... | A01M 1/08 43/113 |
| 6,898,896 | B1 * | 5/2005 | McBride ............... | A01M 1/023 43/107 |
| 2004/0103579 | A1 * | 6/2004 | Nolen ................... | A01M 1/023 43/107 |
| 2005/0066570 | A1 * | 3/2005 | Mosher, II ............. | A01M 1/02 43/139 |
| 2005/0252075 | A1 * | 11/2005 | Achor ................... | A01M 1/023 43/139 |

(Continued)

*Primary Examiner* — Darren W Ark
*Assistant Examiner* — Brady W Frazier
(74) *Attorney, Agent, or Firm* — Prakash Nama; Global IP Services, PLLC

(57) ABSTRACT

A bladeless fan with mosquito killing function, having a base and a wind chamber; the base has an air blower inside; the wind chamber is in communication with an inner cavity of the base; a wall of the wind chamber is provided with an air outlet gap for blowing out an air stream; an electric mosquito killing device is provided in the base below the air blower; through holes are provided on the base (1) for inlet of mosquitos and insects as well as the air stream into the base.

6 Claims, 3 Drawing Sheets

(56) References Cited

U.S. PATENT DOCUMENTS

| | | | |
|---|---|---|---|
| 2008/0168702 A1* | 7/2008 | Jaffrey | A01M 1/023 43/111 |
| 2011/0005123 A1* | 1/2011 | Will | A01M 1/08 43/113 |
| 2011/0236229 A1* | 9/2011 | Fitton | F04D 29/703 417/234 |
| 2014/0165452 A1* | 6/2014 | Rocha | A01M 1/08 43/113 |
| 2015/0264913 A1* | 9/2015 | Ganmor | A01M 5/08 43/139 |
| 2018/0271080 A1* | 9/2018 | Kim | A01M 1/04 |
| 2018/0368383 A1* | 12/2018 | Ko | A01M 1/023 |

\* cited by examiner

BLADELESS FAN WITH MOSQUITO KILLING FUNCTION

BACKGROUND OF THE INVENTION

The present invention relates to the technical field of electronic fan, and more specifically relates to a bladeless fan with mosquito killing function.

A currently available bladeless fan generally comprises a base and a wind chamber. An air blower is provided inside the base. A wall of the wind chamber is provided with air outlet holes. An air stream generated by the air blower blows out through the air outlet holes. A conventional bladeless fan serves the sole purpose of blowing air.

Chinese patent application CN102777422A discloses a bladeless fan for repelling mosquitos and cooling, comprising a fan body, a turbofan is arranged in a base of the fan body for extracting air beside the base to blow out the air from an upper annular air outlet through a sealed support; a box is arranged at the bottom of the sealed support, and is positioned below the turbofan when being pushed in the base; the box can be pushed or pulled; toner, floral water and liquid mosquito repellent can be put in the box. Air blown out by the fan contains toner and floral water so as to freshen and rapidly cool down the user's skin. Also, as the air blown out from the fan contains liquid mosquito repellent, mosquitos can be repelled so as to relieve the nuisance caused by the mosquitos.

However, as liquid substance like the floral water is disposed below the turbofan in the above said Chinese patent application, moisture of the liquid can easily corrode the turbofan. As such, the materials making the fan should meet a certain quality standard. Also, dust mixed with moisture can easily accumulate on the surfaces of the blades and affect the hygienic condition of the air blown out.

BRIEF SUMMARY OF THE INVENTION

In view of the aforesaid disadvantages now present in the prior art, the present invention provides a bladeless fan with mosquito killing function. The present invention can kill mosquito effectively and can be used hygienically.

The present invention has the following technical scheme: A bladeless fan with mosquito killing function, comprising a base and a wind chamber; an air blower is provided inside the base; the wind chamber is in communication with an inner cavity of the base; a wall of the wind chamber is provided with an air outlet gap for blowing out an air stream.

The bladeless fan with mosquito killing function has the following characteristics:

An electric mosquito killing device is provided in the base below the air blower; through holes are provided on the base for inlet of mosquitos and insects as well as the air stream into the base;

The electric mosquito killing device can be selected according to practical situation from any kind of electric mosquito killing devices available in the prior art; preferably, the electric mosquito killing device comprises a circuit board, mosquito allurement lights, and a high voltage electric net sequentially arranged from bottom to top;

The mosquito allurement lights and the high voltage electric net are both connected with the circuit board;

In order that the structure of the present invention is more compact, the mosquito allurement lights can be positioned on an upper surface of the circuit board;

The high voltage electric net comprises an annular frame horizontally disposed inside the base; a plurality of electrode rods are arranged in parallel in the annular frame;

In order that a user may selectively turn on the fan and/or the electric mosquito killing device according to the needs in different situations, a mosquito killing module and a fan module are integrated on the circuit board; an outer wall of the base is provided with a control switch for controlling the circuit board, a mosquito killing switch for controlling the mosquito killing module, and a volume switch for adjusting a volume of wind blown out from the bladeless fan;

In order to prevent the mosquitos and insects from escaping from the base once entered into the base when only the fan is on and the electric mosquito killing device is off, a blocking device for preventing mosquitos and insects from escaping is provided between the high voltage electric net and the mosquito allurement lights;

The blocking device can have different structures; preferably, the blocking device comprises a blocking panel horizontally disposed in the base; a center portion of the blocking panel is provided with a center hole; a plurality of elongated breathing holes are provided on the blocking panel; the elgonated breathing holes are arranged radially around the center hole;

A periphery of the center hole is provided with a few upwardly extending support rods mutually spaced with respect to one another; a cover panel is connected with upper ends of the support rods;

In order to enhance the effect of allurement and to allow unblocked inlet of mosquitos and insects into the base, the through holes are positioned between the mosquito allurement lights and the blocking panel.

Compared with prior art, the bladeless fan with mosquito killing function as provided by the present invention has good mosquito killing effect. Also, since odorant containing moisture is not used by the present invention, dirt will not be accumulated in the base and the wind chamber and thus ensuring good hygiene.

DETAILED DESCRIPTION OF THE INVENTION

The present invention is further described in detail below with reference to an embodiment and the accompanying drawings.

Figure 1:
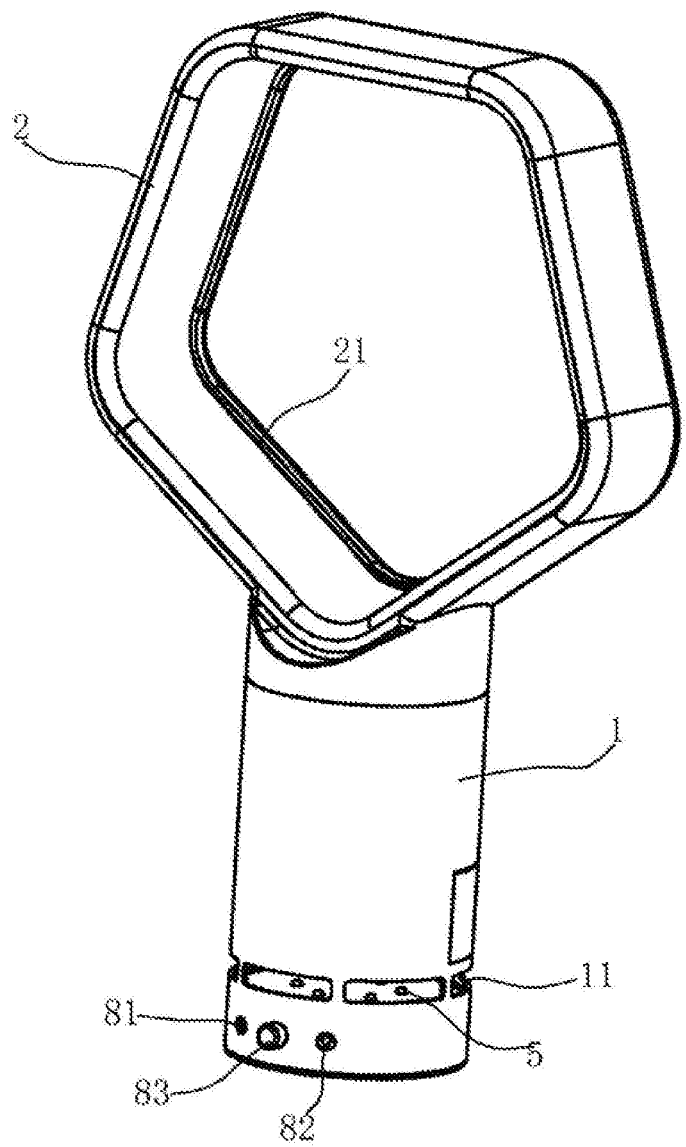
FIG. 1 is a perspective structural view of the present invention in an assembled condition.
Figure 2:
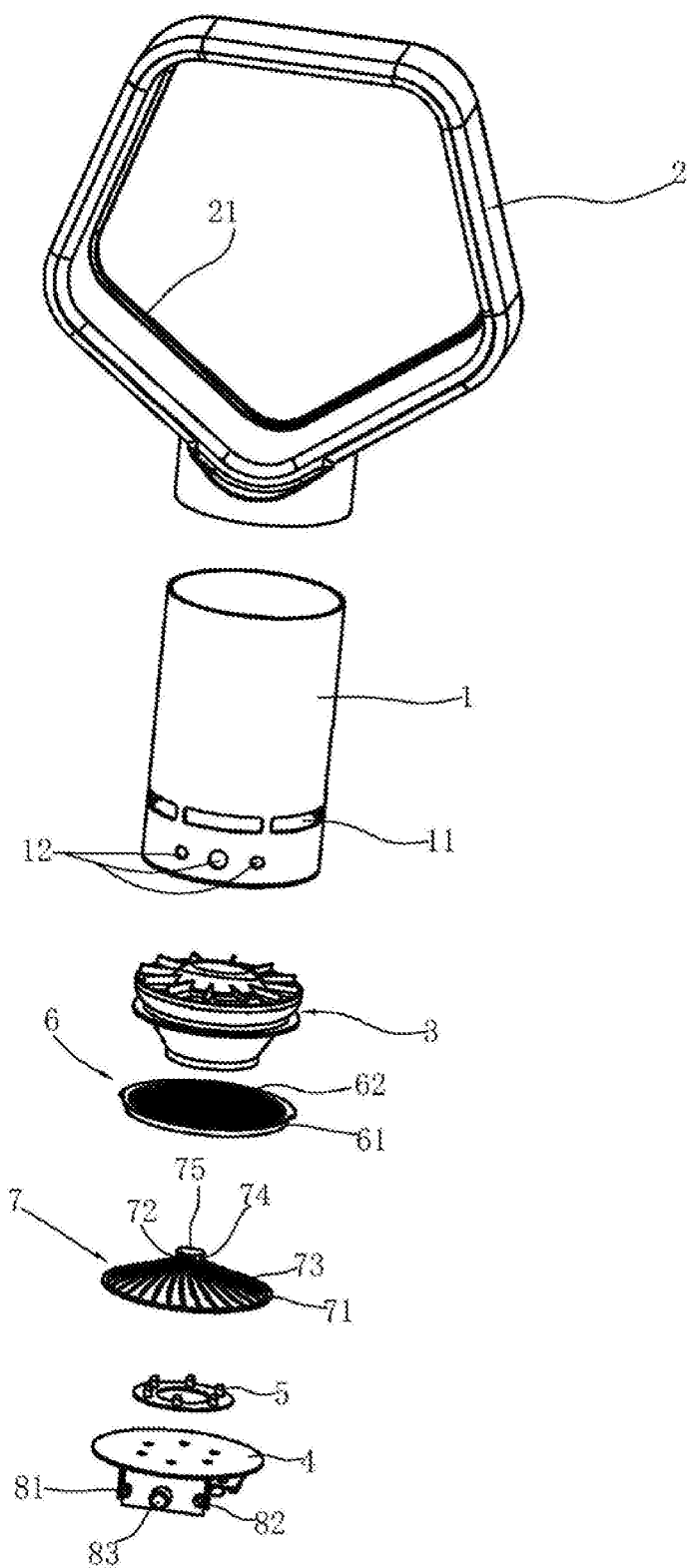
FIG. 2 is an exploded perspective structural view of the present invention.
Figure 3:
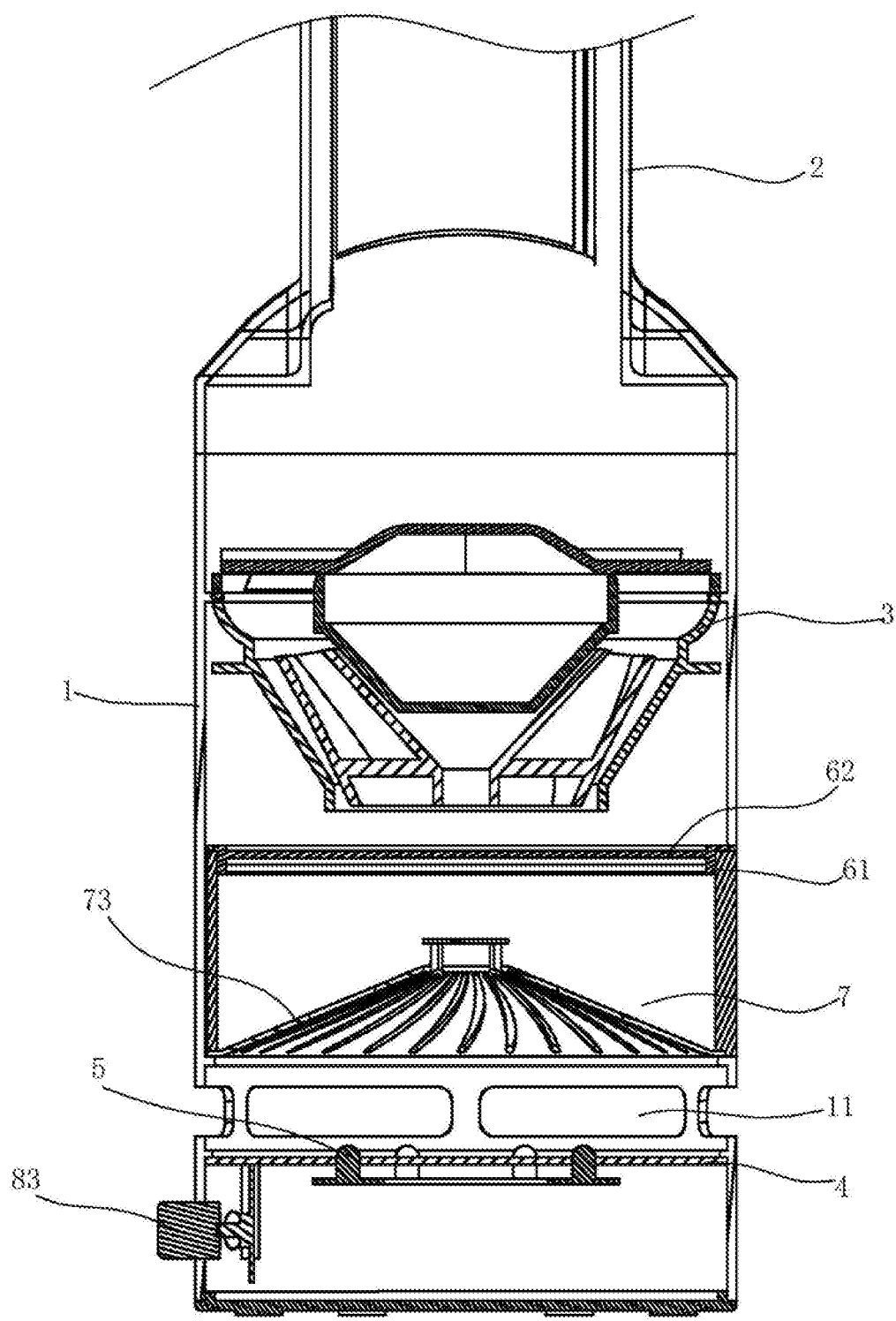
FIG. 3 partially illustrates a longitudinal sectional view of FIG. 1.

As shown in FIGS. 1-3, a bladeless fan with mosquito killing function comprises:

A base 1, in a cylindrical shape; an inner cavity of the base is mounted with an electronical mosquito killing device and an air blower 3; a side wall of the base is provided with a plurality of through holes 11 allowing inlet of air and also mosquitos into the inner cavity of the base 1; the side wall of the base is also provided with openings 12 to allow exposure of various switches;

Air chamber 2, connected with an exit of the base 1, for directing an air stream generated by the air blower 3; a wall of the wind chamber 2 is provided with an air outlet gap 21 for blowing out the air stream;

The air blower 3, disposed in the inner cavity of the base 1, for generating the air stream which is blown out through the air outlet gap 21; any kind of air blower 3 currently available in the market can be selected and used according to practical need;

Circuit board 4, provided in the inner cavity of the base, and positioned proximal to a bottom surface of the base; a mosquito killing module and a fan module (not shown in the figures) are integrated on the circuit board; an outer wall of the base is provided with a control switch 81 for controlling the circuit board 4, a mosquito killing switch 82 for controlling the mosquito killing module, and a volume switch 83 for adjusting a volume of wind blown out from the bladeless fan; the air blower 3 is connected with the fan module;

The electronic mosquito killing device is disposed in the inner cavity of the base, and is positioned between the air blower 3 and the circuit board 4; the electronic mosquito killing device comprises mosquito allurement lights 5, a high voltage electric net 6 and the mosquito killing module on the circuit board 4; the mosquito allurement lights 5 and the high voltage electric net 6 are both connected with the circuit board 4;

in the present embodiment, the mosquito allurement lights 5 are disposed on an upper surface of the circuit board 4 below yet proximal to the through holes 11 so that lights of the mosquito allurement lights can be seen through the through holes to achieve the purpose of attracting mosquitos and insects;

the high voltage electric net 6 comprises an annular frame 61 horizontally disposed inside the base; a plurality of electrode rods 62 are arranged in parallel in the annular frame 61;

A blocking device 7, disposed in the inner cavity of the base, and positioned between the high voltage electric net 6 and the mosquito allurement lights 5 for preventing mosquitos and insects from escaping; the blocking device 7 comprises a blocking panel 71 horizontally disposed in the base above the through holes 11 to allow unblocked inlet of mosquitos and insects through the through holes; a center portion of the blocking panel 71 is provided with a center hole 72; a plurality of elongated breathing holes 73 are provided on the blocking panel 71; the elgonated breathing holes 73 are arranged radially around the center hole 72; a periphery of the center hole 72 is provided with a few upwardly extending support rods 74 mutually spaced with respect to one another; a cover panel 75 is connected with upper ends of the support rods 74.

When the control switch 81 is switched on, the air blower operates to suck in air through the through holes 11 and then blow the air out through the air outlet gap 21; rotate the volume switch 83 to adjust the volume of air being blown out; press the mosquito killing switch 82 to power up the mosquito killing module, light up the mosquito allurement lights 5 and electrify the high voltage electric net 6; mosquitos and insects are attracted by the lights of the mosquito allurement lights and so they fly towards the through holes 11; when the mosquitos and insects fly near to the through holes, suction power of the air blower will pull the mosquitos and insects through the through holes 11 and into the inner cavity of the base; the mosquitos and insects are carried by the wind direction to pass through the blocking panel 71 through gaps between the support rods 74 and the cover panel 75, and then touch the high voltage electric net where they are killed by electricity.

When the mosquito allurement lights are off, mosquitos and insects near the through holes will still be pulled into the base through the through hole under the strong suction power of the air blower 3. In this situation, the high voltage electric net is not electrified, and the mosquitos and insects will not be killed by electricity. However, under the blocking effect of the blocking panel 71, mosquitos and insects are difficult to escape from the through holes 11. Therefore, mosquitos and insects will be eventually suffocated to death in the inner cavity of the base.

What is claimed is:

1. A bladeless fan with mosquito killing function, comprising a base (1) and a wind chamber (2); an air blower (3) is provided inside the base (1); the wind chamber (2) is in communication with an inner cavity of the base (1); a wall of the wind chamber (2) is provided with an air outlet gap (21) for blowing out an air stream; wherein
    an electric mosquito killing device is provided in the base (1) below the air blower (3);
    through holes (11) are provided on the base (1) for inlet of mosquitos and insects as well as the air stream into the base;
    the electric mosquito killing device comprises a circuit board (4), mosquito allurement lights (5), and a high voltage electric net (6) sequentially arranged from bottom to top;
    the mosquito allurement lights (5) and the high voltage electric net (6) are both connected with the circuit board (4).

2. The bladeless fan with mosquito killing function as in claim 1, wherein the mosquito allurement lights (5) is positioned on an upper surface of the circuit board (4);
    the high voltage electric net (6) comprises an annular frame (61) horizontally disposed inside the base (1); a plurality of electrode rods (62) are arranged in parallel in the annular frame (61).

3. The bladeless fan with mosquito killing function as in claim 2, wherein a mosquito killing module and a fan module are integrated on the circuit board (4); an outer wall of the base is provided with a control switch (81) for controlling the circuit board (4), a mosquito killing switch (82) for controlling the mosquito killing module, and a volume switch (83) for adjusting a volume of wind blown out from the bladeless fan.

4. The bladeless fan with mosquito killing function as in claim 3, wherein a blocking device (7) for preventing mosquitos and insects from escaping is provided between the high voltage electric net (6) and the mosquito allurement lights (5).

5. The bladeless fan with mosquito killing function as in claim 4, wherein the blocking device (7) comprises a blocking panel (71) horizontally disposed in the base; a center portion of the blocking panel (71) is provided with a center hole (72); a plurality of elongated breathing holes (73) are provided on the blocking panel (71); the elgonated breathing holes (73) are arranged radially around the center hole (72); a periphery of the center hole (72) is provided with a few upwardly extending support rods (74) mutually spaced with respect to one another; a cover panel (75) is connected with upper ends of the support rods (74).

6. The bladeless fan with mosquito killing function as in claim 5, wherein the through holes (11) are positioned between the mosquito allurement lights (5) and the blocking panel (71).

* * * * *